United States Patent [19]
Pritt

[11] Patent Number: 5,926,581
[45] Date of Patent: Jul. 20, 1999

[54] SYSTEM FOR TOPOGRAPHIC MAPPING FROM REMOTELY SENSED IMAGES

[75] Inventor: Mark D. Pritt, Walkersville, Md.

[73] Assignee: Lockheed Martin Corporation, Bethesda, Md.

[21] Appl. No.: 08/637,842

[22] Filed: Apr. 25, 1996

[51] Int. Cl.[6] .............................. G06K 9/00; G06K 9/32; G06K 9/36; H04N 7/18
[52] U.S. Cl. .......................... 382/294; 382/154; 382/284; 348/159
[58] Field of Search .................................... 382/284, 294, 382/154; 348/145, 164, 159; 356/2

[56] References Cited

U.S. PATENT DOCUMENTS

| | | | |
|---|---|---|---|
| 4,037,048 | 7/1977 | Walker | 348/164 |
| 4,101,891 | 7/1978 | Jain et al. | 342/25 |
| 4,170,774 | 10/1979 | Schaefer | 342/94 |
| 4,724,526 | 2/1988 | Cole et al. | 359/470 |
| 4,951,136 | 8/1990 | Drescher et al. | 348/145 |
| 5,160,931 | 11/1992 | Brown | 342/25 |
| 5,170,171 | 12/1992 | Brown | 342/191 |
| 5,189,424 | 2/1993 | Brown | 342/25 |
| 5,260,708 | 11/1993 | Auterman | 342/25 |
| 5,309,522 | 5/1994 | Dye | 382/154 |
| 5,606,627 | 2/1997 | Kuo | 382/154 |

OTHER PUBLICATIONS

"Image Registration with Use of the Epipolar Constraint for Parallel Projections", Mark D. Pritt, *J.Opt.Soc.Am.A*, vol. 10, No. 10, Oct. 1993, pp. 2187–2192.

"Automated Subpixel Image Registration of Remotely Sensed Imagery", M.D. Pritt, *IBM Journal of Research and Development*, vol. 38, No. 2, Mar. 1994, pp. 157–166.

Hsieh, et al "Recovering 3D Information from Complex Aeroal Imagery", IEEE, May 1990.

*Primary Examiner*—Andrew W. Johns
*Assistant Examiner*—Daniel G. Mariam
*Attorney, Agent, or Firm*—Lane, Aitken & McCann

[57] ABSTRACT

In a method for generating a model of terrain, images of the terrain are generated at different angles. Matching points in the images are identified and from these matching points, the coefficients of a registration mapping equation are determined. A height term of the registration matching equation is corrected for scaling and shear into an elevation term in the coordinates of one of the images. The elevation is rotated into the coordinates of the ground plane of the terrain to provide a digital elevation model of the terrain. Interpolation is carried out through the digital elevation model to provide a three-dimensional model of the terrain. In a system for measuring the accuracy of a registration mapping equation, first and second images are generated from a digital elevation model. The registration mapping equation being tested is applied to the images to generate an estimated digital matching function which is compared with the actual registration matching function for the two images.

10 Claims, 4 Drawing Sheets

5,926,581

SYSTEM FOR TOPOGRAPHIC MAPPING FROM REMOTELY SENSED IMAGES

BACKGROUND OF THE INVENTION

This invention relates to a system and method for generating a topographical map or digital elevation model of ground terrain from two images of the ground terrain. Topographical mapping is the process of generating three-dimensional height models of ground terrain. The most common method for topographical mapping is stereoscopy or stereoimaging in which the parallax or disparity between common features of a pair of images are proportional to the topographic height of the features. By identifying a number of such matching features, the height of the terrain can be calculated at these points and a smooth surface can be interpolated through them to create a three-dimensional model.

For stereoimaging to work properly, the imaging sensors must be positioned at a specific orientation relative to one another. The viewing axes of the sensors must be mutually parallel and perpendicular to the imaginary line that connects the sensor positions. The major drawback of stereoimaging systems is the constraint placed on the relative orientation of the sensors. The present invention improves upon the stereoimaging systems in that it places no constraint on the orientations of the sensors. The method and system works for images taken from any point of view and orientation.

SUMMARY OF THE INVENTION

The method of the invention is based on an equation that models a registration mapping function which matches the features from a first image received by a first image sensor to corresponding features of a second image received by a second image sensor. The coefficients of the equation are determined from a least squares fit to a set of corresponding points in the two images. The equation yields a height term in the coordinates of one of the image sensors, which height term can be converted to actual terrain height from the known viewing orientation of the image sensors.

The system of the invention as described above makes use of a specific registration mapping equation or algorithm which is described in detail in the Description of the Preferred Embodiments of the Invention and which is highly accurate. Prior to the present invention, there have been no methods of measuring the accuracy of a registration mapping algorithm and the accuracy of registration mapping algorithms have been judged subjectively. Accordingly, there is a need for a method to objectively measure the accuracy of an image registration mapping algorithm. The present invention provides such a measuring system. In accordance with this aspect of the invention, input data representing a terrain model viewing orientations of image sensors and illumination conditions are inputted to a three-dimensional renderer which produces a pair of test images from the input data. The test images are applied to the image registration algorithm being tested. The algorithm being tested outputs an estimate of the registration mapping function. The terrain model, the viewing orientations of the image sensors and the illumination conditions are also inputted into a registration function generator which computes the actual registration mapping function for the images that would be produced by the two image sensors. The actual registration mapping function and the estimated registration function are then applied to a registration error measurer which computes the difference between the actual registration function and the estimated registration function produced by the algorithm being tested as a measurement of the accuracy of the registration algorithm being tested.

DESCRIPTION OF THE PREFERRED EMBODIMENTS

Figure 1:
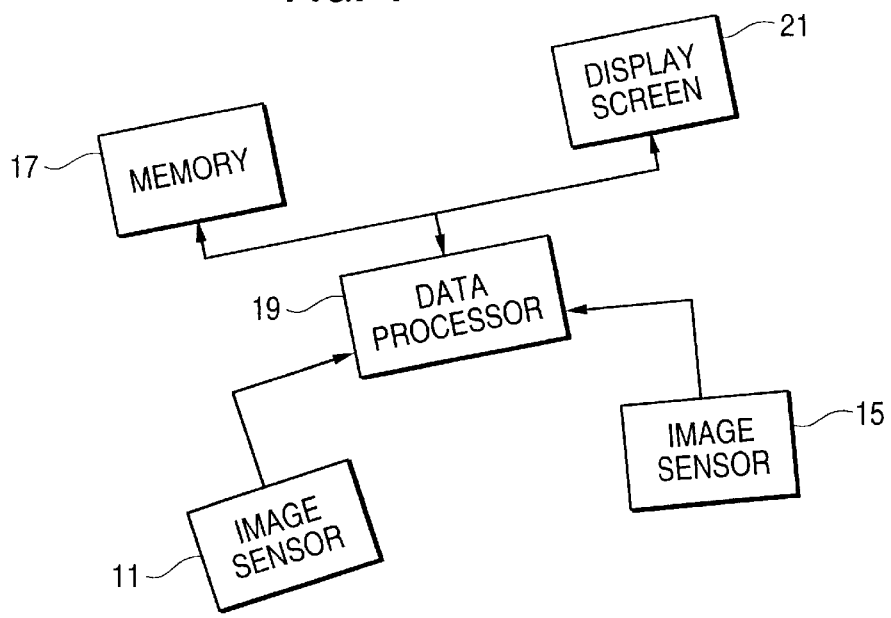
FIG. 1 illustrates the apparatus of the invention used to carry out the topographical mapping method of the invention.
Figure 1:
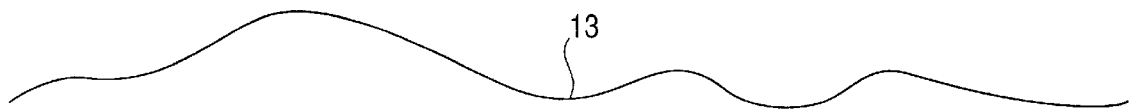

In the system of the invention, an image sensor 11 receives an image of a scene 13, which may be a terrain surface, and an image sensor 15 receives an image of the same scene 13. The image sensors may be optical image sensors or they may be sensors of a synthetic aperture radar platform. The images are converted into pixel data and stored in a memory 17 by means of a data processor 19. The pixel image data obtain by the sensor 11 is represented as $x_i$, $y_i$, where $x_i$ and $y_i$ are the coordinates of the pixel data in the image plane of the sensor 11 where i=1 to n, n equaling the number of pixels in the data. Similarly the pixel image data obtained by the sensor 15 in the image plane of the sensor 15 is represented by $u_i$, $v_i$ where $u_i$ and $v_i$ are the coordinates of the pixel image data in the image plane of the sensor 15. The image plane of the sensor 11 will be perpendicular to the viewing axis of the sensor 11 and the image plane of the sensor 15 will be perpendicular to the viewing axis of the sensor 15. The scene 13 is considered to be on a grid wherein the incremental surfaces of the grid are represented by $a_i$, $b_i$ and $c_i$, wherein $a_i$ and $b_i$ are the horizontal coordinates of the surface and $c_i$ is the elevation of the surface. The system of the invention makes use of a registration mapping equation which maps the features in one image to the corresponding features in the other image or in other words maps one image into alignment with the other. This registration mapping equation has the form:

$$F(x,y)=A(x,y)+h(x,y)e \qquad (1)$$

In Equation (1), x and y are the coordinates of a point in the first image plane, F(x,y) is a corresponding point in the second image, A(x,y) is an affine transformation, h(x,y) is a scaler function and e is a fixed vector in the second image plane and can be defined as:

$$e = \begin{vmatrix} e_1 \\ e_2 \end{vmatrix}$$

The derivation of this registration mapping equation is described in an article in the IBM Journal of Research and Development entitled "Automated Subpixel Image Registration of Remotely Sensed Imagery" by M. D. Pritt, Volume 38, No. 2, March 1994, pages 157–165, and in an article in the Journal of Optical Society of America entitled "Image Registration With Use of the Epipolar Constraint for Parallel Projections" by Mark D. Pritt, Volume 10, No. 10, October 1993, pages 2187–2192. These two publications are hereby incorporated by reference. In accordance with the invention at least four matching points are identified in the images represented by the pixel data. The selection of the matching points in the preferred embodiment is carried out manually and may be achieved by displaying the two images represented by the pixel data on a display screen 21 and identifying unique features in the two displayed images. Alternatively, the matching points may be selected by an automated system. The matching points are inputted to the data processor which then stores the corresponding sets of coordinates of each pair of matching points. In accordance with Equation 1, the coordinates of the incremental points of the scene produced by the sensor 11 can be mapped into the scene produced by the sensor 15 in accordance with the equation:

$$F(x_i, y_i) = (u_i, v_i) = A(x_i, y_i) + h_i e \qquad (2)$$

In this equation $u_i$ and $v_i$ are the coordinates of the same point of the second image plane. The affine transformation $A(x,y)$ may be written in expanded form as:

$$A(x_i, y_i) = \begin{bmatrix} a_{11} & a_{12} \\ a_{21} & a_{22} \end{bmatrix} \begin{bmatrix} x_i \\ y_i \end{bmatrix} + \begin{bmatrix} a_{13} \\ a_{23} \end{bmatrix} \qquad (3)$$

or as $$A(x_i, y_i) = a_{11}x_i + a_{12}y_i 30 \; a_{13}, \; a_{21}x_i + a_{22}y_i + a_{23} \qquad (4)$$

The two expressions of Equation (4) defining $A(x_i, y_i)$ determine components of $u_i$ and $v_i$, respectively.

The coefficients of the affine transformation $A(x_i, y_i)$, the value of $h_i$ and the vector e are determined making use of the matching points in the two images by means of the least squares method described in the above-cited article in the Journal of the Optical Society of America. As explained in this article, the parameters of the Equation (2) are not unique but conditions may be imposed upon $h_i$ and on the vector e so that only one set of parameters will satisfy the mapping function. Specifically, $e_1$ of the vector e is required to be a positive value. The magnitude of the vector e is set to equal 1 ($|e|=1$) and $h_i$ is normalized so that:

$$\sum_{i=1}^{N} h_i = \sum_{i=1}^{N} x_i h_i = \sum_{i=1}^{N} y_i h_i = 0 \qquad (5)$$

The least-squares estimate of the parameters of the function (2) is determined from a collection of match points $[(x_i, y_i), (u_i, v_i)]$, $i = 1 \ldots N$. The sum of squared errors:

$$\sum_{i=1}^{N} (a_{11}x_i + a_{12}y_i + a_{13} + h_i e_1 - u_i)^2 + \sum_{i=1}^{N} (a_{21}x_i + a_{22}y_i + a_{23} + h_i e_2 - v_i)^2 \qquad (6)$$

will be minimized subject to the above-described normalization constraints. In the least squares expression (6), the coefficients $a_{ij}$ are from the affine transformation $A(x_i, y_i)$ of Equation (2). Differentiating expression (6) with respect to each of the six coefficients $a_{ij}$ yields the normal equations:

$$\sum_{i=1}^{N} (a_{11}x_i^2 + a_{12}x_i y_i + a_{13}x_i + e_1 x_i h_i - u_i x_i) = 0 \qquad (7)$$

$$\sum_{i=1}^{N} (a_{11}x_i y_i + a_{12}y_i^2 + a_{13}y_i + e_1 y_i h_i - u_i y_i) = 0$$

$$\sum_{i=1}^{N} (a_{11}x_i y_i + a_{12}y_i^2 + a_{13} + e_1 h_i - u_i) = 0$$

$$\sum_{i=1}^{N} (a_{21}x_i^2 + a_{22}x_i y_i + a_{23}x_i + e_2 x_i h_i - v_i x_i) = 0$$

$$\sum_{i=1}^{N} (a_{21}x_i y_i + a_{22}y_i^2 + a_{23}y_i + e_2 y_i h_i - v_i y_i) = 0$$

$$\sum_{i=1}^{N} (a_{21}x_i + a_{22}y_i + a_{23} + e_2 h_i - v_i) = 0.$$

It will now be clear why the normalization constraints are necessary. All the terms involving $h_i$ disappear in Equation 7, resulting in the normal equations for minimizing the sum of squares:

$$\sum_{i=1}^{N} (a_{11}x_1^2 + a_{12}x_i y_i + a_{13}x_i - u_i x_i) = 0 \qquad (8)$$

$$\sum_{i=1}^{N} (a_{11}x_i y_i + a_{12}y_i^2 + a_{13}y_i - u_i y_i) = 0$$

$$\sum_{i=1}^{N} (a_{11}x_i + a_{12}y_i + a_{13} - u_i) = 0$$

$$\sum_{i=1}^{N} (a_{21}x_i^2 + a_{22}x_i y_i + a_{23}x_i - v_i x_i) = 0$$

$$\sum_{i=1}^{N} (a_{21}x_i y_i + a_{22}y_i^2 + a_{23}y_i - v_i y_i) = 0$$

$$\sum_{i=1}^{N} (a_{21}x_i + a_{22}y_i + a_{23} - v_i) = 0.$$

From Equation (8), the coefficients $a_{11}$, $a_{12}$, $a_{13}$, $a_{21}$, $a_{22}$, and $a_{23}$ of the affine transformation, $A(x,y)$, of Equation (2) are determined.

For the purposes of determining h and e, the expression (6) can be reduced to $\Sigma(h_i e_1 - s_i)^2 + \Sigma(h_i e_2 - t_i)^2$, in which $(s_i, t_i) = (u_i, v_i) - A(x_i, y_i)$. Differentiating with respect $e_1, e_2$ and $h_i$ yields the equations:

$$\sum_{i=1}^{N} (e_1 h_i^2 - s_i h_i) = 0 \qquad (9)$$

$$\sum_{i=1}^{N} (e_2 h_i^2 - t_i h_i) = 0 \qquad (10)$$

and, $$e_1^2 h_i - e_1 s_i + e_2^2 h_i - e_2 t_i = 0, \qquad i = 1 \ldots N \qquad (11)$$

Equation (11) yields the expression $h_i$, in terms of e, $$h_i = s_i e_1 + t_i e_2, \qquad (12)$$

Eliminating the term $\Sigma h_i^2$ from Equations (9) and (10), substituting Equation (12) into the resulting equation, and solving for the slope $m=e_2/e_1$ yields the following equation:

$$m=[\alpha+\sigma(\alpha^2+4)^{1/2}]/2, \quad (13)$$

where $\alpha=\Sigma(t_i^2-s_i^2)/\Sigma s_i t_i$ and $\sigma=\text{sgn}(\Sigma s_i t_i)$.

The ratio of $e_2$ over $e_1$ equals the slope m of the epipolar vector e and since the magnitude of the epipolar vector has been set at 1 the determination of the slope of the vector provides complete determination of the epipolar vector.

The least-squares estimate of the parameters $A(x_i,y_i)$, $h(x_i,y_i)$ and e of the registration equation (2) is thus determined from a collection of match points by the following steps. First, the affine transformation function $A(x_i,y_i)$ is determined by a least-squares fit to the match points. Then the slope m of the epipolar vector e is determined by a least-squares fit that minimizes the orthogonal distances to the points $(s_i,t_i)=(u_i,v_i)-A(x_i,y_i)$. This slope is given by Equation (13). The vector e is then defined as:

$$[1/(1+m^2)^{1/2}, m/(1+m^2)^{1/2}] \quad (14)$$

The heights $h_i=h(x_i,y_i)$ are then determined from Equation (12).

The determining $h_i$ for each $x_i$ and $y_i$ provides a set of points $x_i$, $y_i$, $h_i$ in the coordinates of the first image sensor. The elevation in the coordinates of the image sensor can then be determined by correcting $h_i$ by the appropriate shear and scaling terms. To make this correction, knowledge of the image geometry is required. Specifically, the angular orientation of the second image sensor 15 to the first image sensor must be known and the angular orientation of the ground plane of the terrain being measured to the first image sensor must be known. The former angular orientation is called "relative orientation" and the latter orientation is called "absolute orientation". Each image sensor is assumed to have its own coordinate system associated with it. In the first image sensor 11, the xy plane is the image plane of the first sensor, and the z axis is parallel to the line-of sight vector from the first sensor to the ground scene being measured. In the second image sensor, the uv plane is the image plane of the second sensor and the w axis is the line of sight vector from the second sensor 15 to the ground scene being measured. The relative orientation of the coordinate system x,y,z and u,v,w is defined by 3 by 3 matrix R as follows:

$$R = \begin{bmatrix} r_{11} & r_{12} & r_{13} \\ r_{21} & r_{22} & r_{23} \\ r_{31} & r_{32} & r_{33} \end{bmatrix} \quad (15)$$

Similarly, the absolute orientation of the ground plane coordinate system to the coordinate system of the first image sensor 15 is defined by the matrix T:

$$T = \begin{bmatrix} t_{11} & t_{12} & t_{13} \\ t_{21} & t_{22} & t_{23} \\ t_{31} & t_{32} & t_{33} \end{bmatrix} \quad (16)$$

In these rotation matrices, the values of the coefficients $r_{ij}$ and $t_{ij}$ are expressions of th sines and cosines of the rotation angles between the two coordinate systems. By definition, a point $x_i,y_i,z_i$ is in the coordinate system of the first image sensor 11 and can be transposed into the coordinate system of the second sensor 15 $u_i,v_i,w_i$ by the following calculation:

$$\begin{bmatrix} u_i \\ v_i \\ w_i \end{bmatrix} = R \begin{bmatrix} x_i \\ y_i \\ z_i \end{bmatrix} \quad (17)$$

Similarly, a point in the coordinate system of the image sensor 11 can be transposed to coordinate system of the ground plane by the following calculation:

$$\begin{bmatrix} a_i \\ b_i \\ c_i \end{bmatrix} = T \begin{bmatrix} x_i \\ y_i \\ z_i \end{bmatrix} \quad (18)$$

In the above expression, the ground plane is represented by the horizontal axes a and b and the vertical axis by the c axis. It will be appreciated that in the above calculation, the linear displacement between the coordinate systems has been ignored. With the above rotation defined as stated above, the value of $h_i$ can be corrected by the appropriate shear and scaling terms to represent elevation $z_i$ in the coordinate system of the first sensor 11 as follows:

$$z_i=(h_i-\alpha x_i-By_i)/\gamma \quad (19)$$

in which $$\alpha=[(a_{11}-r_{11})/r_{13}+(a_{21}-r_{21})/r_{23}]/2 \quad (20)$$

$$B=[(a_{12}-r_{12})/r_{13}+(a_{22}-r_{22})/r_{23}]/2 \quad (21)$$

and $$\gamma=(e_1/r_{13}+e_2/r_{23})/2 \quad (22)$$

The coordinates of each point $x_i$, $y_i$ and $z_i$ in the coordinate system of the first image sensor 11 can then be rotated into the coordinate system of the ground plane coordinates a,b,c by the rotation matrix T as follows:

$$\begin{bmatrix} a_i \\ b_i \\ c_i \end{bmatrix} = T \begin{bmatrix} x_i \\ y_i \\ z_i \end{bmatrix}$$

This calculation provides a digital elevation model of the ground terrain.

Figure 2:
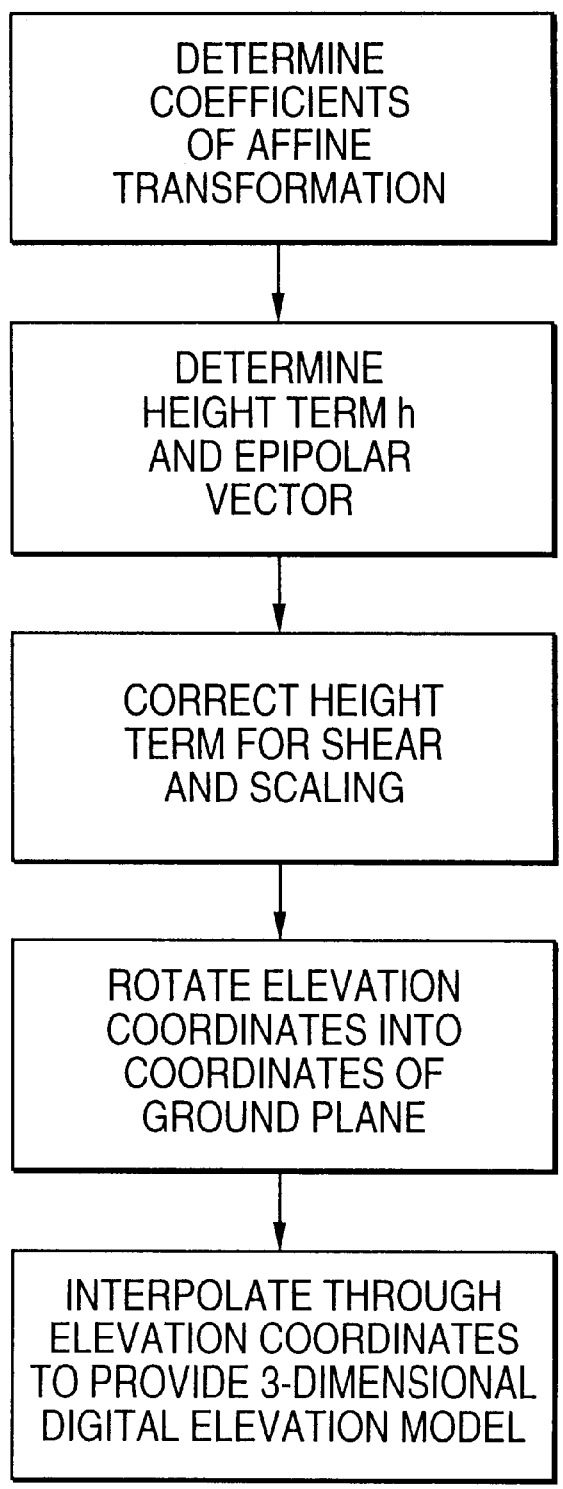
FIG. 2 is a flow chart of the computer program used to carry out the method of the invention.

Once the digital elevation has been determined, a smooth surface can be interpolated through the digital elevation points to yield a three-dimensional topographical model of the terrain surface. FIG. 2 represents a flow chart of the above-described operation of the computer to derive the digital terrain model from the matching points of the two images.

In accordance with the invention, when the coefficients of the registration matching function have been determined by the least squares method as described above, the computer flags the matching points with the highest least square fitting errors. The operator then has the option of discarding these matching points, correcting the matching points or replacing them with new matching points. In this manner, the coefficients of the registration matching function are determined with a high degree of accuracy resulting in a digital elevation model which accurately corresponds to the actual terrain.

Figure 3:
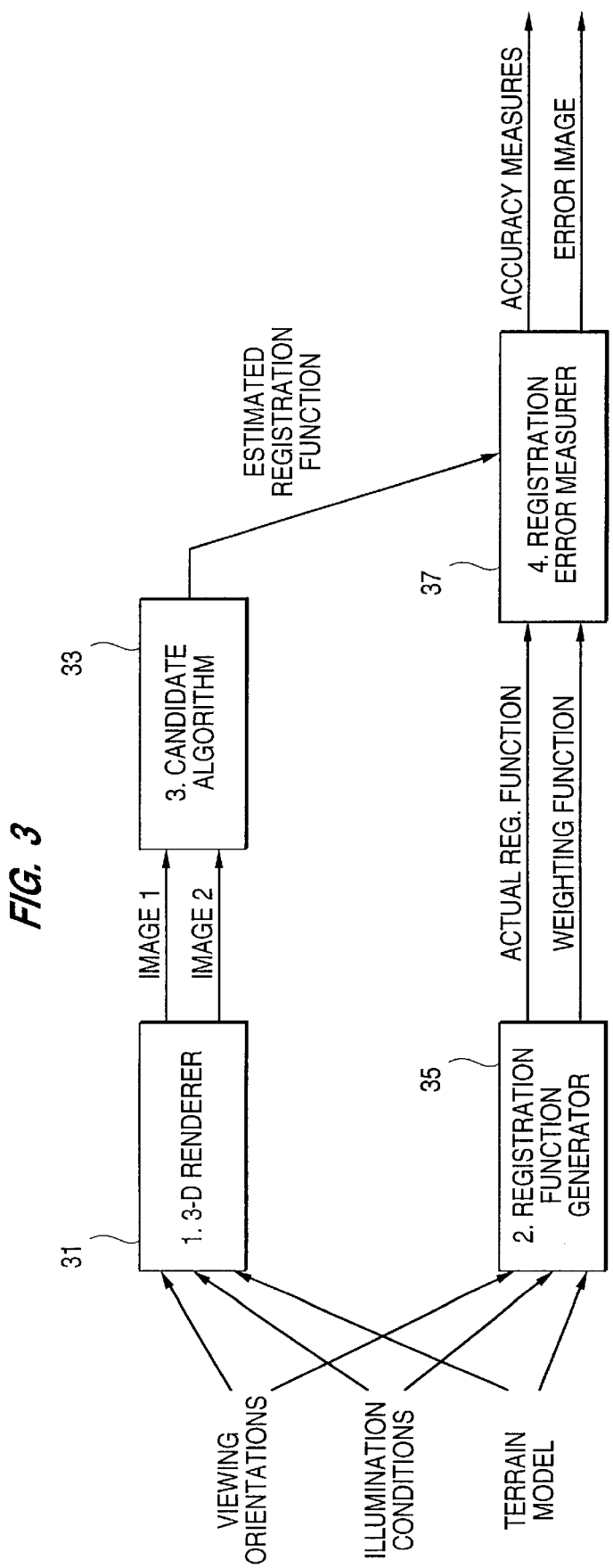
FIG. 3 illustrates the system of the invention for measuring the accuracy of an image registration mapping algorithm.

As shown in FIG. 3, the system measuring the accuracy of an image registration algorithm comprises a three-dimensional renderer 31 which receives input digital data representing a terrain elevation model, data indicating the illumination of the terrain elevation model and data indicating the viewing angles for two images of the terrain elevation model. From this input data, the three-dimensional renderer introduces two pixel based output images of the terrain elevation model. These images preferably would be produced by the method described in an article by M. D. Pritt entitled "Fast Algorithm for the Rendering of Three-Dimensional Surfaces" in *Substance Identification Analytic*, J. L. Flanagen, eds. Proc. SPIE 2093, pp. 462–471 (1994) and also in patent application Ser. No. 08/131,357, filed Oct. 4, 1993, U.S. Pat. No. 5,542,032, filed by the inventor of this application, Mark D. Pritt, in October 1993. The two pixel based images are applied to a candidate image registration mapping algorithm system which applies a candidate algorithm to be tested to the two images to produce an estimated registration function. For example, the candidate algorithm system may employ the algorithm of Equation (1) above. Alternatively, it may be the algorithm described by A. J. Lee et al. in an article entitled "Fast Autonomous Registration of Landsat, SPOT and Digital Map Imagery" in *Integrating Photogrammetric Techniques with Scene Analysis and Machine Vision*, Proc. SPIE, Orlando, Fla. (1993). The candidate algorithm system 33 will produce an output estimated registration function $G_{ij}=(G^1_{ij}, G^2_{ij})$. $G^1_{ij}$ indicates the displacement in the x coordinates to transpose a point ij in a first image to a second image, $G^2_{ij}$ indicates the displacement of the y coordinates to transpose a point ij in the first image to a point in the second image.

The digital elevation terrain model illumination conditions and viewing orientations are also inputted into a registration function generator 35 which generates as an output an actual registration function $F_{ij}=(F^1_{ij}, F^2_{ij})$ of the images produced by the two viewing orientations and also produces a weighting function which indicates whether or not the point from the digital elevation model is occluded or hidden from view at the viewing angles at which the terrain in viewed.

The actual registration function, the weighting function and the estimated registration function are all applied to the registration error function measurer which compares the actual registration function with the estimated registration function to obtain an accuracy measurement and also to generate an error image. The error measurements are standard statistical measurements which may be the weighted RMS error, the average error and the maximum error.

The weighted RMS error is defined by the formula:

$$\sqrt{\frac{\sum_{i,j} w_{ij}[(F^1_{ij}-G^1_{ij})^2 + (F^2_{ij}-G^2_{ij})^2]}{\sum_{ij} w_{ij}}} \quad (23)$$

The average error, for example, is defined by the formula:

$$\frac{\sum_{i,j} w_{ij}\sqrt{(F^1_{ij}-G^1_{ij})^2 + (F^2_{ij}-G^2_{ij})^2}}{\sum_{ij} w_{ij}} \quad (24)$$

In these equations, $w_{ij}$ is the weighting function and is 1 or zero depending upon whether the surface point $_{ij}$ is hidden or occluded at the viewing angles.

Figure 4A:
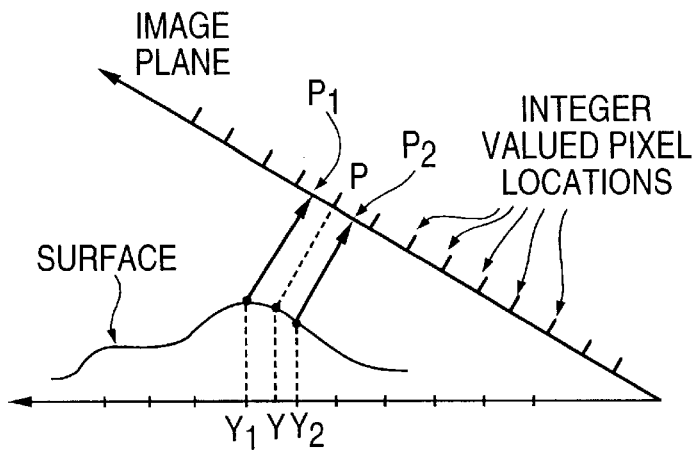
FIGS. 4a through 4c illustrate the operation of the actual registration function generator employed in the system of FIG. 3.
Figure 4B:
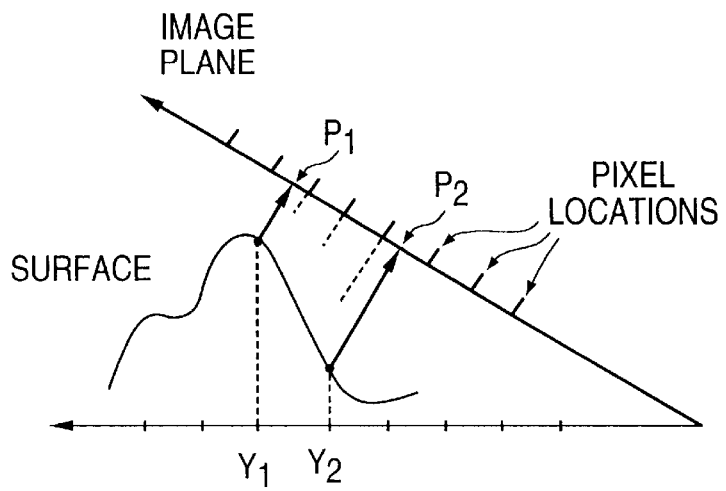
Figure 4C:
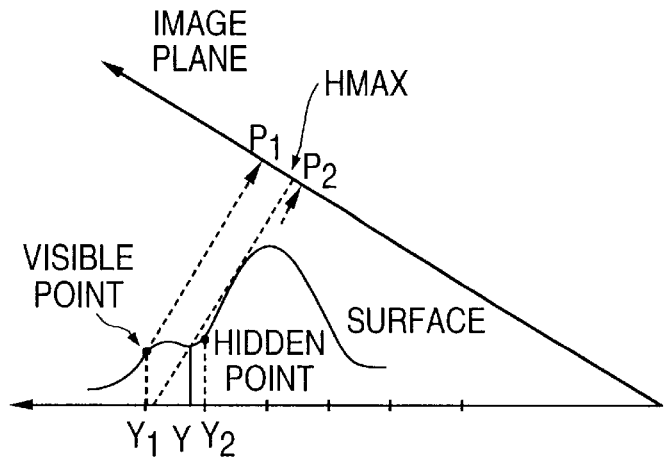

The registration function generator 35 uses a algorithm similar to that used in the 3D renderer with a few modifications. The operation of the registration function generator 35 is illustrated in FIGS. 4a–4c. As shown in FIG. 4a, points $y_1$ and $y_2$ are projected into the image plane from the first viewing angle to points $p_1$ and $p_2$. In the specific example of FIG. 4a, points $p_1$ and $p_2$ fall on opposite sides of the incremental pixel location p. Point p is then projected back onto the surface represented by the digital terrain model and by interpolation between points $y_1$ and $y_2$ the location y on the terrain corresponding to the incremental point p of the first image is determined. Point y is then projected into the image plane at the second viewing angle and the difference between the locations of the point p and the projection of the point y into the image plane of the second viewing angle provide the values of the function $F_{ij}$ corresponding to point p. This process is repeated for each point on the digital terrain to get a registration function $F_{ij}$ for each terrain point.

FIG. 4b illustrates an example in which the points $y_1$ and $y_2$ are on a steep, sloping surface facing the image plane of the first viewing angle so that the corresponding points $p_1$ and $p_2$ are separated by more than one pixel increment. In this case, each of the pixel increments is projected back onto the model of the surface to define corresponding points on the surface and then these corresponding points are projected into the image plane of the second viewing angle and the differences in the projection points in the xy dimensions are determined to compute the values of $F_{ij}$ for each incremental point.

FIG. 4c illustrates a third example where the point $y_2$ on the terrain elevation model is hidden. As shown in FIG. 4c, the point $y_2$ is hidden at the viewing angle of the image plane. When a point y projected onto the digital elevation terrain model is hidden, then the weighting function $w_{ij}$ in Equation (23) is set to zero so that such a point is not included in the registration accuracy calculation. To determine whether a point is in the shadow and therefore it has a weighting function $w_{ij}$ of zero, the registration function generator computes a value HMAX which is updated to the maximum value of $p_1$. If the point p being projected back onto the digital elevation model is less than HMAX, then the weighting function for this point $w_{ij}$ is set to zero. If the point p projected back on the elevation model is not less than HMAX, the weighting value is set to 1.

The above described systems of the invention thus provide an improved method and system for generating a digital elevation model or a three-dimensional topographical model from a pair of image sensors in which no constraint is placed on the orientation of the two image sensors relative to one another. In the specific embodiment of the invention, the image sensors sense visual images of the terrain, but the system of the invention is also readily adapted to operate on images sensed by synthetic aperture radar. As described above, the system makes use of a registration mapping function and also provides a system and method for measuring the accuracy of an image registration function.

The above description is of a preferred embodiment of the invention and modification may be made thereto without departing from the spirit and scope of the invention which is defined in the appended claims.

I claim:

1. A method of generating a digital elevation model of terrain comprising generating a first image of said terrain, generating a second image of said terrain at a different viewing angle than said first image, determining matching points in said first and second images, defining a registration matching equation which matches points from said first image to said second image, said matching equation including coefficients, determining from said matching points with a data processor the coefficients of said registration matching equation, said matching equation having a height term which varies with the terrain elevation in the coordinates of one of said images, correcting with said data processor said height term to correspond to the elevation of said terrain in the coordinates of one of said images, and rotating with said data processor the elevation of said terrain into the coordinates of a ground plane corresponding to said terrain to provide a digital elevation model.

2. A method of producing a three-dimensional model of terrain comprising performing the steps of the method of claim 1 and interpolating with said data processor through the digital elevation model to generate a three-dimensional model of said terrain.

3. A method as recited in claim 1, wherein said registration matching function comprises:

$$(u,v) = A(x,y) + he,$$

wherein x and y are the coordinates in the plane of one of said images, u and v are the coordinates in the plane of the other one of said images, A(x,y) is an affine transformation, h is a height term and e is an epipolar vector.

4. A method as recited in claim 3, wherein the coefficients of said registration matching equation are determined from said matching points by least squares.

5. A method as recited in claim 4, further comprising flagging the matching points which produce the highest fitting errors in the least squares determination and recomputing the registration matching function from a set of matched points which do not include the flagged matching points.

6. A system for measuring the accuracy of a registration mapping equation comprising means for providing a digital elevation model of terrain, means responsive to said digital elevation model to generate images of said digital elevation model at first and second viewing angles, means to apply a registration mapping equation to said first and second images to generate an estimated registration mapping function, means to produce the actual registration mapping function for said images, and means to generate a quantitative measurement of the difference between said estimated registration mapping function and said actual registration mapping function.

7. A method as recited in claim 3, wherein said height term is related to the elevation in one of said images in accordance with a predetermined function and wherein said height term is corrected to correspond to the elevation in the coordinates of one of said images in accordance with said predetermined function.

8. A method as recited in claim 7, wherein said predetermined function is:

$$z_i = (h_i - \alpha x_i - B y_i)/\gamma$$

in which $z_i$ is the elevation of the pixel i in the coordinates of said one of said images, $x_i$ is the x coordinate of the pixel i in the coordinates of said one of said images, $y_i$ is the y coordinate of the pixel i in the coordinates of said one of said images, and $\alpha$, B, and $\gamma$ are scaler values which depend on the relative orientation of the two images.

9. A method as recited in claim 8, wherein $$\alpha = [(a_{11} - r_{11})/r_{13} + (a_{21} - r_{21})/r_{23}]/2$$

$$B = [(a_{12} - r_{12})/r_{13} + (a_{22} - r_{22})/r_{23}]/2$$

$$\gamma = (e_1/r_{13} + e_2/r_{23})/2$$

in which $a_{11}$, $a_{12}$, $a_{21}$, and $a_{22}$ are coefficients in the affine transformation A(x,y) and wherein $r_{11}$, $r_{12}$, $r_{13}$, $r_{21}$, $r_{22}$, $r_{23}$, $r_{31}$, $r_{32}$ and $r_{33}$ are coefficients of the matrix R defining the relative orientation of the coordinates of said images wherein $$\begin{bmatrix} u_i \\ v_i \\ w_i \end{bmatrix} = R \begin{bmatrix} x_i \\ y_i \\ z_i \end{bmatrix}$$

in which $u_i$, $v_i$ and $w_i$ are the coordinates and elevation of the pixel i in the coordinates of the second of said images and $e_1/e_2$ represents the slope of the epipolar vector e.

10. A method as recited in claim 1 wherein said height term is related to the elevation in one of said images in accordance with a predetermined function and wherein said height term is corrected to correspond to the elevation in accordance with said predetermined function.

* * * * *

UNITED STATES PATENT AND TRADEMARK OFFICE
CERTIFICATE OF CORRECTION

PATENT NO : 5,926,581
DATED : July 20, 1999
INVENTOR(S) : Mark D. Pritt

It is certified that error appears in the above-identified patent and that said Letters Patent is hereby corrected as shown below:

Column 4, line 8, change the equation set (7) to read as follows(the entire equation set is printed for clarification; error in the third line of equation set):

$$\sum_{i=1}^{N} (a_{11}x_i^2 + a_{12}x_i y_i + a_{13}x_i + e_1 x_i h_i - u_i x_i) = 0$$

$$\sum_{i=1}^{N} (a_{11}x_i y_i + a_{12}y_i^2 + a_{13}y_i + e_1 y_i h_i - u_i y_i) = 0$$

$$\sum_{i=1}^{N} (a_{11}x_i + a_{12}y_i + a_{13} + e_1 h_i - u_i) = 0 \qquad (7)$$

$$\sum_{i=1}^{N} (a_{21}x_i^2 + a_{22}x_i y_i + a_{23}x_i + e_2 x_i h_i - v_i x_i) = 0$$

$$\sum_{i=1}^{N} (a_{21}x_i y_i + a_{22}y_i^2 + a_{23}y_i + e_2 y_i h_i - v_i y_i) = 0$$

UNITED STATES PATENT AND TRADEMARK OFFICE
CERTIFICATE OF CORRECTION

PATENT NO. : 5,926,581
DATED : July 20, 1999
INVENTOR(S) : Mark D. Pritt

It is certified that error appears in the above-identified patent and that said Letters Patent is hereby corrected as shown below:

$$\sum_{i=1}^{N} (a_{21}x_i + a_{22}y_i + a_{23} + e_2 h_i - v_i) = 0.$$

Signed and Sealed this

Eighteenth Day of April, 2000

Attest:

Q. TODD DICKINSON

*Attesting Officer*  *Director of Patents and Trademarks*